United States Patent
Collis et al.

(10) Patent No.: US 12,471,747 B2
(45) Date of Patent: Nov. 18, 2025

(54) CLEANING ROBOT

(71) Applicant: Dyson Technology Limited, Wiltshire (GB)

(72) Inventors: Charles Anthony Neild Collis, Bath (GB); James Trevor Clarkson, Tewkesbury (GB)

(73) Assignee: Dyson Technology Limited, Wiltshire (GB)

( * ) Notice: Subject to any disclaimer, the term of this patent is extended or adjusted under 35 U.S.C. 154(b) by 482 days.

(21) Appl. No.: 17/801,784

(22) PCT Filed: Feb. 24, 2021

(86) PCT No.: PCT/GB2021/050470
§ 371 (c)(1),
(2) Date: Aug. 23, 2022

(87) PCT Pub. No.: WO2021/171013
PCT Pub. Date: Sep. 2, 2021

(65) Prior Publication Data
US 2023/0101981 A1    Mar. 30, 2023

(30) Foreign Application Priority Data
Feb. 27, 2020    (GB) .................................... 2002784

(51) Int. Cl.
  *A47L 11/40*    (2006.01)
  *G05D 1/00*    (2024.01)
(52) U.S. Cl.
  CPC ........ *A47L 11/4011* (2013.01); *G05D 1/0044* (2013.01); *G05D 1/0255* (2013.01);
  (Continued)

(58) Field of Classification Search
  CPC ............. A47L 11/4011; A47L 2201/04; A47L 2201/06; A47L 9/2805; A47L 2201/02;
  (Continued)

(56) References Cited

U.S. PATENT DOCUMENTS 10,058,997 B1 * 8/2018 Chao ...................... B25J 9/1661
10,391,633 B1    8/2019 Hickman et al.
(Continued)

FOREIGN PATENT DOCUMENTS

CN    104737085 A    6/2015
CN    109998421 A    7/2019
(Continued)

OTHER PUBLICATIONS

Office Action received for Japanese Patent Application No. 2022-551809, mailed on Aug. 15, 2023, 9 pages (5 pages of English Translation and 4 pages of Original Document).
(Continued)

Primary Examiner — Aniss Chad
Assistant Examiner — Christine Nguyen Huynh
(74) Attorney, Agent, or Firm — Tucker Ellis LLP; Michael G. Craig

(57) ABSTRACT

Measures for use operating a robot having one or more sensors. At the robot, a representation of an environment of the robot is generated by operating the one or more sensors to sense a set of parameters representative of the environment of the robot. The representation includes at least one surface in the environment other than a surface on which the robot is located. Control data is received from the electronic user device. The control data indicates a desired action to be performed at the at least one surface in the environment of the robot. In response to receipt of the control data, the robot is caused to perform the desired action at the at least one surface in the environment of the robot.

16 Claims, 8 Drawing Sheets

(52) U.S. Cl.
CPC ........ *G05D 1/0274* (2013.01); *A47L 2201/04* (2013.01); *A47L 2201/06* (2013.01)

(58) Field of Classification Search
CPC . A47L 5/00; A47L 11/24; A47L 11/40; G05D 1/0044; G05D 1/0255; G05D 1/0274; B25J 9/0003; B25J 13/089
See application file for complete search history.

(56) References Cited

U.S. PATENT DOCUMENTS

| | | | |
|---|---|---|---|
| 10,427,306 | B1 | 10/2019 | Quinlan et al. |
| 2008/0215184 | A1 | 9/2008 | Choi et al. |
| 2012/0072023 | A1 | 3/2012 | Ota |
| 2017/0273527 | A1 | 9/2017 | Han et al. |
| 2017/0361468 | A1 | 12/2017 | Cheuvront et al. |
| 2018/0074508 | A1 | 3/2018 | Kleiner et al. |
| 2018/0281179 | A1 | 10/2018 | Michalakis |
| 2018/0353044 | A1 | 12/2018 | Erkek et al. |
| 2019/0212730 | A1* | 7/2019 | Jones .................. G05D 1/0234 |
| 2019/0212752 | A1* | 7/2019 | Fong .................... G05D 1/6987 |
| 2019/0213438 | A1* | 7/2019 | Jones .................. G05D 1/2285 |
| 2019/0246858 | A1 | 8/2019 | Karasikov et al. |
| 2019/0250627 | A1 | 8/2019 | Witt et al. |
| 2019/0344428 | A1 | 11/2019 | Park et al. |
| 2020/0019156 | A1 | 1/2020 | Drew et al. |
| 2020/0345191 | A1 | 11/2020 | Furuta et al. |
| 2023/0084228 | A1 | 3/2023 | Collis et al. |
| 2023/0114258 | A1 | 4/2023 | Collis et al. |

FOREIGN PATENT DOCUMENTS

| | | |
|---|---|---|
| EP | 3508938 A2 | 7/2019 |
| JP | 2002-244731 A | 8/2002 |
| JP | 2004-268148 A | 9/2004 |
| JP | 2008-068348 A | 3/2008 |
| JP | 2019-109845 A | 7/2019 |
| KR | 20190123366 A | 11/2019 |
| WO | 2007/041295 A2 | 4/2007 |
| WO | 2008/104912 A2 | 9/2008 |
| WO | 2013/018323 A1 | 2/2013 |
| WO | 2019/097626 A1 | 5/2019 |

OTHER PUBLICATIONS

Office Action received for Chinese Patent Application No. 202180016732.8, mailed on Sep. 7, 2023, 26 pages (15 pages of English Translation and 11 pages of Original Document).

Office Action received for Japanese Patent Application No. 2022-551811, mailed on Sep. 26, 2023, 5 pages (3 pages of English Translation and 2 pages of Original Document).

International Search Report and Written Opinion received for PCT Patent Application No. PCT/GB2021/050468, mailed on Apr. 29, 2021, 12 pages.

International Search Report and Written Opinion received for PCT Patent Application No. PCT/GB2021/050469, mailed on Apr. 29, 2021, 11 pages.

International Search Report and Written Opinion received for PCT Patent Application No. PCT/GB2021/050470, mailed on May 14, 2021, 9 pages.

Search Report received for GB Application No. 2002780.1, mailed on Aug. 18, 2020, 2 pages.

Search Report received for GB Application No. 2002781.9, mailed on Aug. 19, 2020, 1 page.

Search Report received for GB Application No. 2002784.3, mailed on Aug. 25, 2020, 1 page.

* cited by examiner

CLEANING ROBOT

CROSS-REFERENCE TO PRIOR APPLICATION

This application is a § 371 National Stage Application of PCT International Application No. PCT/GB2021/050470 filed Feb. 24, 2021, which claims the priority of United Kingdom Application No. 2002784.3, filed Feb. 27, 2020, each of which are herein incorporated by reference in their entirety.

TECHNICAL FIELD

The present disclosure concerns robots. In particular, but not exclusively, the present disclosure concerns measures, including methods, apparatus and computer program products, for controlling a robot and operating a robot.

BACKGROUND

Mobile robots are becoming increasingly commonplace and may be used within home environments to perform tasks such as cleaning and tidying.

There has been rapid advancement in the field of robot cleaning devices, especially robot vacuum cleaners and floor mopping robots, the primary objective of which is to navigate a user's home autonomously and unobtrusively whilst cleaning the floor. It is typically desirable for these robots to require as little assistance from a human user as possible, preferably requiring no human assistance.

In performing cleaning or tidying tasks, a robot has to navigate the area which it is required to clean. Preferably, the robots can autonomously navigate and negotiate obstacles within their environment. Robots are usually provided with a number of sensors that enable them to navigate around an environment.

Some cleaning robots are provided with a rudimentary navigation system, whereby the robot uses a 'random bounce' method, whereby the robot will travel in any given direction until it meets an obstacle, at which time the robot will turn and travel in another random direction until another obstacle is met. Over time, it is hoped that the robot will have covered as much of the floor space requiring to be cleaned as possible. Unfortunately, these random bounce navigation schemes have been found to be lacking, and often large areas of the floor that should be cleaned will be completely missed. These navigation systems are also not appropriate where a robot is required to follow a particular path rather than covering a large floor space.

Simultaneous Localisation and Mapping (SLAM) techniques are starting to be adopted in some robots. These SLAM techniques allow a robot to adopt a more systematic navigation pattern by viewing, understanding, and recognising the area around it. Using SLAM techniques, more systematic navigation patterns can be achieved, and as a result, in the case of a cleaning robot, the robot will be able to more efficiently clean the required area.

It is expected that from time to time during operation, robots will encounter problems. For example, a robot may come across an unknown object within an environment and may not know how to process such an object, or the robot may become stuck in a particular location. Often, such problems will require human intervention. However, human intervention can be perceived as a nuisance, particularly if it requires the user to manually intervene at the robot.

SUMMARY

According to an aspect of the present disclosure, there is provided a method of controlling a robot, the method comprising, at an electronic user device:

receiving, from the robot, data representative of an environment of the robot, the received data indicating a location of at least one moveable object in the environment;

in response to receipt of the representative data, displaying a representation of the environment of the robot on a graphical display of the electronic user device;

receiving input from a user of the electronic user device indicating a desired location for the at least one moveable object in the environment of the robot; and in response to receipt of the user input, transmitting control data to the robot, the control data being operable to cause the robot to move the at least one object to the desired location in the environment of the robot.

In embodiments, the environment of the robot is a house or an area of a house. In embodiments the electronic user device is, for example, a tablet or a laptop, which is operated by a user, and which displays the data representing the environment of the robot to the user, for example, as an image of a room of a house, indicating the current location of one or more moveable objects. In embodiments, data indicating the location of at least one moveable object in the environment indicates locations of household items which the user may wish to be tidied or moved. In embodiments, using the electronic user device, the user inputs desired locations for these items, and in response to this user input, the robot is directed to move the items to the desired locations. Using data communication between the robot and the electronic user device, the user may therefore direct the robot to tidy or reconfigure household items. For example, the user may direct the robot to tidy clothes, tidy the kitchen, or rearrange furniture in the room. In embodiments, control data may specify a path to a desired location. In other embodiments, control data may specify a desired end location, and the robot may determine a path to the desired location.

In embodiments, user input is received via the display of the electronic user device. In embodiments the user interacts with the display to input desired locations for displayed objects.

In embodiments, the user input comprises a drag and drop action from a current location of the at least one moveable object to the desired location. In embodiments, the user selects moveable objects within the environment of the robot that are displayed on the graphical display, and drags them to a different location within the environment, which is also displayed on the graphical display, releasing the objects at the desired location. This provides an intuitive and interactive method for the user to provide instructions for the robot. In other embodiments, the user input comprises typed instructions. Using the display, the user may type an object to be moved to a desired location, and may type the desired location for the object.

In embodiments, the user input is received via a microphone, and the input comprises an audible indication of the desired location for the at least one moveable object. In embodiments, the user may verbally indicate an object that is to be moved to a desired location and may verbally indicate the desired location. This enables hands free operation of the electronic user device, and does not require visual interaction with the display.

In embodiments, the method comprises receiving, from the robot, confirmation data confirming that the at least one moveable object has been moved to the desired location, and in response to receipt of the confirmation data, displaying an updated environment of the robot on the graphical display, wherein the updated environment indicates the location of the at least one moveable object. In embodiments, when the robot has moved an object to a desired location, an updated image representative of the environment, for example, an updated image of a room of a house may be displayed, indicating the new location of the robot. This enables a user to determine whether or not the robot has correctly moved the object to the desired location, and to determine whether a further move may be required.

In embodiments, the method comprises receiving, from the robot, request data requesting the user to provide an identifier for one or more objects in the environment, and receiving input from a user of the electronic user device indicating a desired identifier for the at least one object in the environment of the robot. In embodiments, the electronic user device transmits response data to the robot, the response data including the desired identifier. In embodiments, the robot identifies unknown or unidentified objects within its environment during idle time, when not responding to control data. In embodiments, the user of the electronic device inputs a desired identifier via the display of the electronic user device. The identifier may for example be an identifier specific to the particular object, or may be a common identifier for a class of objects. The desired identifiers may be stored in the robot's memory, alternatively the identifiers may be stored off the robot, for example in 'the cloud'/an external device, such that the user and/or the robot can use these identifiers to identify the object in future actions. Whilst requesting data from a user limits the robot's ability to operate autonomously, requesting the user to identify objects may simplify the required functionality of the robot, as the robot will not be required to have pre-existing (or such detailed) knowledge of classifications or surfaces. Requesting user input can also help to avoid erroneous classification by the robot, particularly, in borderline cases, cases where a new object has been identified, or cases where the robot is uncertain. The user may also input custom identifiers, for example, a user may input the identifier 'Bob's mug', rather than the more general classifier of 'mug'.

According to an aspect of the present disclosure, there is provided apparatus for use in controlling a robot at an electronic user device, the apparatus being configured to:
  receive, from the robot, data representative of an environment of the robot, the received data indicating a location of at least one moveable object in the environment;
  in response to receipt of the representative data, display a representation of the environment of the robot on a graphical display of the electronic user device;
  receive input from a user of the electronic user device indicating a desired location for the at least one moveable object in the environment of the robot; and
  in response to receipt of the user input, transmit control data to the robot, the control data being operable to cause the robot to move the at least one moveable object to the desired location in the environment of the robot.

In embodiments, the robot and the electronic user device are configured to interact via a wireless network, such that a user can remotely control the robot. A user may thus be able to control a robot in their home, for example whilst being at work, being out of the house, or whilst in another area of the house.

According to an aspect of the present disclosure, there is provided a computer program product comprising a set of instructions, which, when executed by a computerised device, cause the computerised device to perform a method of controlling a robot via a network, the method comprising, at an electronic user device:
  receiving, from the robot via the network, data representative of an environment of the robot, the received data indicating a location of at least one moveable object in the environment;
  in response to receipt of the representative data, displaying the environment of the robot on a graphical display of the electronic user device;
  receiving input from a user of the electronic user device indicating a desired location for the at least one moveable object in the environment of the robot; and
  in response to receipt of the user input, transmitting control data to the robot via the network, the control data being operable to cause the robot to move the at least one object to the desired location in the environment of the robot.

According to an aspect of the present disclosure, there is provided a method of operating a robot, the robot having one or more sensors, the method comprising, at the robot:
  generating a representation of an environment of the robot by operating the one or more sensors to sense a set of parameters representative of the environment of the robot, wherein the representation comprises a location for at least one moveable object in the environment;
  transmitting, to an electronic user device, data representative of the environment of the robot;
  receiving control data from the electronic user device, the control data indicating a desired location for the at least one moveable object in the environment of the robot; and
  in response to receipt of the control data, operating the robot to move the at least one object to the desired location in the environment of the robot.

In embodiments, the robot has at least one of an image sensor, a proximity sensor, and touch sensor. In embodiments, at least one sensor senses the position of an object, which may be the position in two or three dimensions, or the dimensions of an object. In embodiments, the sensor senses the shape of an object, and/or surface textures of the object.

In embodiments, the step of generating a representation of an environment of the robot generating comprises generating a list of known objects and associated identifiers, and storing a list of known objects and identifiers for each object in the list. In embodiments, the step of generating comprises identifying an unknown object not in the list, and in response to the identification, transmitting to the electronic user device a request to identify the unknown object. In embodiments, the step of generating comprises receiving from the electronic user device, data indicating an identifier for the unknown object, and in response to receipt of the data indicating the identifier, updating the list to associate the identifier with the unknown object.

In embodiments, the robot differentiates sensed objects into known objects, which can be stored in a list, along with their identifier, and unknown objects. In embodiments, known objects are objects that have been previously identified, by the user or otherwise, and which are stored in the robot's memory or in 'the cloud'/an external device. In embodiments, the list of known objects and associated identifiers is stored, and the list increases as the user identifies more unknown objects. Over time, this may facilitate easier operation of the robot, as the robot will be able to identify and interact with more objects, without requiring as much user input.

In embodiments, the method comprises maintaining the generated representation at the robot or an external device, by one or more of periodically updating the generated representation, and updating the representation in response to operation of the one or more sensors indicating a change in one or more of the parameters in the set.

In embodiments, the robot updates the representation during idle time, when not responding to control data and transmits the updated representation to the electronic user device. In embodiments, the robot updates the representation periodically at fixed time intervals, and transmits the updated representation to the electronic user device. In embodiments, the robot transmits an updated representation to the electronic user device if there is a change in a parameter. This enables the user to react, and transmit control data to the robot, if the user wises the robot to perform an action in response to a change the environment.

In embodiments, the robot transmits a representation to an external device and the external device updates a stored representation. The representation can be stored in 'the cloud' or other network storage which is accessible by the user.

In embodiments, the list stored at the robot comprises a home location for at least one object in the list. In embodiments, the home location for the at least one object has been previously input by a user, using the electronic user device. In embodiments, the home location specifies the default desired location for the object if no other desired location is specified. A user is therefore able to request that objects are returned to their home locations, rather than inputting specific desired locations.

In embodiments, the list comprises a plurality of objects having the same identifier, and the objects in the plurality have the same home location. In embodiments, if the list is updated to include a new object with the same identifier as an object already in the list, the new object is automatically assigned the same home location. Home locations for identified objects may therefore be automatically assigned, without requiring additional user input.

In embodiments, the transmitted request to the electronic user device further comprises a request to specify a home location for the unknown object, and the data received at the robot comprises data specifying the home location for the unknown object. In embodiments, updating the list comprises updating the list to include the specified home location for the unknown object.

In embodiments, operating the robot to move the at least one object to the desired location in the environment of the robot comprises operating the robot to move the at least one object to its home location. In embodiments, operating the robot comprises operating the robot to move a plurality of objects to their home locations. This enables a user to operate a robot to move multiple objects to different 'home' locations, without having to specify individual desired locations for each object.

According to an aspect of the present disclosure, there is provided apparatus for operating a robot, the robot having one or more sensors, the apparatus being configured to:

generate a representation of an environment of the robot by operating the one or more sensors to sense a set of parameters representative of the environment of the robot, wherein the representation includes a location for at least one moveable object in the environment;

transmit, to an electronic user device, data representative of the environment of the robot;

receive control data from the electronic user device, the control data indicating a desired location for the at least one moveable object in the environment of the robot; and in response to receipt of the control data, operate the robot to move the at least one object to the desired location in the environment of the robot.

The apparatus may comprise a computer chip or control module that can be inserted into a robot.

According to an aspect of the present disclosure, there is provided a computer program product comprising a set of instructions, which, when executed by a computerised device, cause the computerized device to perform a method of operating a robot, the robot having one or more sensors, the method comprising:

generating a representation of an environment of the robot by operating the one or more sensors to sense a set of parameters representative of the environment of the robot, wherein the representation includes a location for at least one moveable object in the environment;

transmitting, to an electronic user device, data representative of the environment of the robot;

receiving control data from the electronic user device, the control data indicating a desired location for the at least one moveable object in the environment of the robot; and in response to receipt of the control data, operating the robot to move the at least one object to the desired location in the environment of the robot.

According to an aspect of the present disclosure, there is provided a robot having one or more sensors, the robot being configured to:

generate a representation of an environment of the robot by operating the one or more sensors to sense a set of parameters representative of the environment of the robot, wherein the representation includes a location for at least one moveable object in the environment;

transmit, to an electronic user device, data representative of the environment of the robot;

receive control data from the electronic user device, the control data indicating a desired location for the at least one moveable object in the environment of the robot; and in response to receipt of the control data, move the at least one object to the desired location in the environment of the robot.

According to an aspect of the present disclosure there is provided a method of operating a robot, the robot having one or more sensors, the method comprising:

generating a representation of an environment of the robot by:

operating the one or more sensors to sense a set of parameters representative of the environment of the robot; and creating a list of objects in the environment and associated identifiers for each object in the list;

receiving control data from the electronic user device, the control data comprising an identifier for an object in the generated list that a user of the electronic user device wishes to locate within the environment; and in response to receipt of the control data, operating the robot and the one or more sensors to search the environment to determine a location of the identified object in the environment.

Hence, operation of the robot can locate an object for the user. In embodiments, the robot uses an image sensor and/or a proximity sensor to determine a list of objects in its environment. In embodiments, the list of objects may be determined by using one or more machine learning tools, for example a convolutional neural network. In other embodiments, the objects may be identified by the user.

In embodiments, a user inputs an identifier into the electronic user device which may be in the list generated by the robot. For example, the user may input 'car keys' into the electronic user device. In embodiments, the robot will search its environment and will use an image sensor, a proximity sensor and/or a touch sensor to locate the identified object.

In embodiments, the method comprises maintaining the generated representation by one or more of periodically updating the generated representation, and updating the representation in response to the operation of the one or more sensors indicating a change in one or more of the parameters in the set. In embodiments, the representation is maintained at the robot. In embodiments, the representation is maintained at an external device. In embodiments, the external device is in 'the cloud', a server, or a network element.

In embodiments, the method comprises transmitting an indication of the determined location of the identified object in the environment to the electronic user device. Hence, a user can be notified of the location of an object via their electronic user device. In embodiments, the robot transmits an indication to the electronic user device if the identified object cannot be located within the environment. In embodiments, the indication may be in the form of an image showing the location of the identified object.

In embodiments, the method comprises transmitting the generated list to the electronic user device. Hence, the user can only request that the robot locates known objects from the list of identified objects. In embodiments, the list is graphically displayed to the user and the user can select an object that they wish to locate using a user interface of the electronic user device.

In embodiments, the set of parameters representative of the environment of the robot is transmitted to the electronic user device. In embodiments, an image representative of the robots environment is transmitted, and is displayed graphically at the electronic user device. In embodiments, the image enables a user to determine which room of a house the robot is located in, or which floor of the house the robot is on. In embodiments, the set of parameters includes the surfaces proximate or accessible to the robot.

In embodiments, creating the list of objects comprises determining a last known location for at least one object in the list. Hence, the user can consult the list, and in doing so the likelihood of the user being able to find an object is increased. In embodiments, the robot determines the last known location for at least one object in the list. In embodiments, the user inputs the last known location for at least one object in the list. In embodiments, the list comprises objects within the robot's current environment that are known to the robot, and their current location. For example, the list may include the identifier 'keys' and the last known location, which may also be the current location, of 'kitchen sideboard'.

In embodiments, operating the robot comprises operating the robot to move proximate to the last known location of the identified object. Hence a user may be able to determine, from the location of the robot, the last known location of the object, and the user can request that the robot performs an action at the object. For example, if the list includes 'keys' last located on 'the kitchen sideboard', the user may input a request to the electronic user device, and the electronic user device may transmit control data to operate the robot to move to the kitchen sideboard.

In embodiments, operating the robot comprises operating the robot to move the identified object to a given location. Hence, a user can go to the given location and expect to see the object, or the user can expect the robot to bring the object to them at a given location. In embodiments, the given location is comprised in the received control data. In embodiments, once the robot has reached the last known location of an identified object, the control data transmitted to the robot operates the robot to move the identified object. In embodiments, the robot uses one or more grabbers to pick up the object. In embodiments the given location is the current location of the user of the electronic device. In embodiments, the given location is the home location of the identified object. In embodiments, the given location is a location of the user (or a location next to/proximate to the user) of the electronic device.

In embodiments, the robot can take a photo or video at the location of the identified object and transmit the photo or video to the electronic user device.

According to an aspect of the present disclosure, there is provided apparatus for use in operating a robot, the robot having one or more sensors. The apparatus is configured to:
generating a representation of an environment of the robot by:
operating the one or more sensors to sense a set of parameters representative of the environment of the robot; and
creating a list of objects in the environment and associated identifiers for each object in the list;
receive control data from the electronic user device, the control data comprising an identifier for an object in the generated list that a user of the electronic user device wishes to locate within the environment; and
in response to receipt of the control data, operate the robot and the one or more sensors to search the environment to determine a location of the identified object in the environment.

The apparatus may comprise a computer chip or module for insertion into a robot.

According to an aspect of the present disclosure, there is provided a computer program product comprising a set of instructions. When executed by a computerised device, the instructions cause the computerized device to perform a method of operating a robot, the robot having one or more sensors, the method comprising:
generating a representation of an environment of the robot by:
operating the one or more sensors to sense a set of parameters representative of the environment of the robot; and
creating a list of objects in the environment and associated identifiers for each object in the list;
receiving control data from the electronic user device, the control data comprising an identifier for an object in the generated list that a user of the electronic user device wishes to locate within the environment; and in response to receipt of the control data, operating the robot and the one or more sensors to search the environment to determine a location of the identified object in the environment.

According to an aspect of the present disclosure, there is provided a robot having one or more sensors. The robot is configured to:
generate a representation of an environment of the robot by:
operating the one or more sensors to sense a set of parameters representative of the environment of the robot; and
creating, or receiving from an electronic user device a list of objects in the environment and associated identifiers for each object in the list;
receive control data from the electronic user device, the control data comprising an identifier for an object in the generated list that a user of the electronic user device wishes to locate within the environment; and
in response to receipt of the control data, operate the robot and the one or more sensors to search the environment to determine a location of the identified object in the environment.

According to an aspect of the present disclosure, there is provided a method of operating a robot, the robot having one or more sensors. The method comprises:
generating, at the robot, a representation of an environment of the robot by operating the one or more sensors to sense a set of parameters representative of the environment of the robot, wherein the representation comprises at least one surface in the environment other than a surface on which the robot is located;
receiving control data, at the robot, from the electronic user device, the control data indicating a desired action to be performed at the at least one surface in the environment of the robot; and
in response to receipt of the control data, causing the robot to perform the desired action at the at least one surface in the environment of the robot.

Hence, operation of the robot can facilitate performing of desired actions at surfaces in the environment. In embodiments, the surface on which the robot is located is the floor of a room of a house. In embodiments, the representation comprises at least one off-floor surface (i.e the off-floor surface is not a floor surface). In embodiments, the representation comprises surfaces such as table tops, work surfaces, carpeted/upholstered or tiled areas, windows, doors and window ledges. In embodiments, the sensors sense the location of the surfaces in two or three dimensions, and may therefore sense the height of the surfaces. In embodiments, the sensors sense the texture of the surfaces, for example, differentiating carpeted/upholstered surfaces, tiled surfaces, glass surfaces or laminate surfaces.

In embodiments, the method comprise transmitting data representative of the environment of the robot to the electronic user device. In embodiments, a representation of the environment of the robot is graphically displayed as an image at the electronic user device. The image may allow the user of the electronic user device to determine the current location of the robot, for example, which room the robot is in, and to determine when and whether a desired action has been performed.

In embodiments, the robot comprises a surface cleaning component, and the desired action comprises a cleaning action. Hence, operation of the robot can facilitate cleaning of the surface, for example, within a room of a house. In embodiments, the robot comprises a cleaning arm, which may be a detachable cleaning arm that can be interchanged with other cleaning arms.

In embodiments, the cleaning action comprises one or more of vacuum cleaning, wiping, mopping, tidying, and dusting. Hence, various different cleaning actions can be carried out; the action performed may be dependent upon the user input. In embodiments, the desired action is dependent upon the surface. For example, the desired action for the carpet may be vacuum cleaning, and the desired action for the table may be wiping. In embodiments, the robot comprises a plurality of detachable cleaning arms, including a vacuum cleaning arm, a wiping arm, a mopping arm, a tidying arm and a dusting arm. The detachable arms may be interchangeable, such that they can be removed and replaced.

In embodiments, generating a representation of the environment comprises generating a list of surfaces in the environment and an associated identifier for each surface in the list. In embodiments, the method comprises transmitting the generated list to the electronic user device, wherein the received control data comprises the associated identifier for at least one surface on the stored list at which the desired action is to be performed. Hence, the user can only request that the robot performs actions at known surfaces from the list of identified surfaces. In embodiments the list is displayed graphically to the user at the electronic user device. In embodiments, the surfaces in the list are surfaces that have been previously identified to the robot, for example, by the user or automatically by the robot.

In embodiments, the method comprises, upon completion of performing the desired action at the at least one surface in the environment of the robot, transmitting a desired action completed notification to the electronic user device. In embodiments, the notification may comprises data that allows an updated image of the surface to be displayed to the user at the electronic user device. This may enable to the user to determine whether the desired action has been completely correctly and to a sufficient standard.

In embodiments, the method comprises maintaining the generated representation at the robot or an external device, by one or more of periodically updating the generated representation, and updating the generated representation in response to operation of the one or more sensors indicating a change in one or more of the set of parameters. Hence, a user can track changes in the environment, for example, in order to identify whether desired actions have been performed or need to be performed at surfaces in the environment. In embodiments, during idle time, the robot updates the generated representation, and may transmit data representative of its environment to the user. In embodiments, the robot updates the generated representation at periodic time intervals. In embodiments, an updated representation is generated upon completion of a desired action. In embodiments, a sensor senses that a parameter of a surface has changed, for example, if a surface is no longer clean. In embodiments, an updated representation is generated in response to such a change. In embodiments, the external device, which may be in 'the cloud' or a network server, updates the generated representation.

According to an aspect of the present disclosure, there is provided apparatus for use in operating a robot, the robot having one or more sensors, the apparatus being configured to:
generate, at the robot, a representation of an environment of the robot, by operating the one or more sensors to sense a set of parameters representative of the environment of the robot, wherein the representation comprises at least one surface in the environment other than the surface on which the robot is located;

receive control data, at the robot, from the electronic user device, the control data indicating a desired action to be performed at the at least one surface in the environment of the robot; and in response to receipt of the control data, cause the robot to perform the desired action at the at least one surface in the environment of the robot.

According to an aspect of the present disclosure, there is provided a computer program product comprising a set of instructions. When executed by a computerised device, the instructions cause the computerized device to perform a method of operating a robot, the robot having one or more sensors, the method comprising:

generating, at the robot, a representation of an environment of the robot, by operating the one or more sensors to sense a set of parameters representative of the environment of the robot, wherein the representation comprises at least one surface in the environment other than a surface on which the robot is located;

receiving control data, at the robot from the electronic user device, the control data indicating a desired action to be performed at the at least one surface in the environment of the robot; and in response to receipt of the control data, causing the robot to perform the desired action at the at least one surface in the environment of the robot.

According to an aspect of the present disclosure, there is provided a robot having one or more sensors. The robot is configured to:

generate a representation of an environment of the robot, by operating the one or more sensors to sense a set of parameters representative of the environment of the robot, wherein the representation comprises at least one surface in the environment other than a surface on which the robot is located;

receive control data from the electronic user device, the control data indicating a desired action to be performed at the at least one surface in the environment of the robot; and in response to receipt of the control data, perform the desired action at the at least one surface in the environment of the robot.

According to an aspect of the present disclosure there is provided a method of controlling a robot. The method comprises, at an electronic user device:

receiving, from the robot, data representative of an environment of the robot, the received data indicating at least one surface in the environment other than a surface on which the robot is located;

in response to receipt of the representative data, displaying a representation of the environment of the robot on a graphical display of the electronic user device;

receiving input from a user of the electronic user device indicating a desired action to be performed at the at least one surface in the environment of the robot; and in response to receipt of the user input, transmitting control data to the robot, the control data being operable to cause the robot to perform the desired action at the at least one surface in the environment of the robot.

In embodiments, the environment of the robot is a house or an area of a house. In embodiments the electronic user device is, for example, a tablet or a laptop, which is operated by a user, and which displays the data representing the environment of the robot to the user, for example, as an image of a room of a house, indicating the current location of one or more moveable objects. In embodiments, data indicating at least one surface in the environment other than a surface on which the robot is located indicates surfaces that the user may wish to be cleaned. In embodiments, using the electronic user device, the user inputs desired actions to be performed at these surfaces for, and in response to this user input, the robot is directed to perform the desired action at the surfaces. Using data communication between the robot and the electronic user device, the user may therefore direct clean surfaces within the robot's environment. For example, the user may direct the robot to vacuum carpets, wipe surfaces or mop floors.

In embodiments, user input indicating the desired action is received via the display of the electronic user device. Hence, a user can input instructions for the robot using the electronic device. The user may input instructions remotely from the robot. In embodiments, the user interacts with the display to input desired actions to be performed at surfaces. This provides an intuitive and interactive method for the user to provide instructions for the robot. In other embodiments, the user input comprises typed instructions. Using the display, the user may type an action to be performed at a surface, or my for example, select an action from a list of possible actions.

In embodiments, user input is received via a microphone, and the input comprises an audible indication of the desired action to be performed at the at least one surface in the environment of the robot. The user may therefore be able to input directions or instructions for the robot using the electronic user device without being in physical contact with the electronic user device. In embodiments, the user may verbally indicate a desired action to be performed at a surface. This enables hands free operation of the electronic user device, and does not require visual interaction with the display.

In embodiments, the method comprises receiving, from the robot, confirmation data confirming that the desired action has been performed at the at least one surface in the environment of the robot; In embodiments, in response to receipt of the confirmation data, an updated environment of the robot is displayed on the graphical display, wherein the updated environment indicates that the desired action has been performed at the at least one surface in the environment of the robot.

In embodiments, when the robot has performed the desired action at the surface, an updated image representative of the environment, for example, showing the surface, may be displayed. This may enable a user to determine whether or not the robot has correctly performed the desired action to a sufficient high standard, and to determine whether or not a further action may be required.

In embodiments, the method requires receiving, from the robot, request data requesting the user to provide an identifier for a given surface in the environment of the robot. In embodiments, the method requires receiving input from a user of the electronic user device indicating a desired identifier for the given surface in the environment of the robot, and transmitting response data to the robot, the response data including the desired identifier.

Whilst requesting data from a user limits the robot's ability to operate autonomously, requesting the user to provide identifiers for a surface may simplify the required functionality of the robot, as the robot will not be required to have pre-existing (or such detailed) knowledge of classifications or objects. Requesting user input can also help to avoid erroneous classification by the robot, particularly, in borderline cases, cases where a new object has been identified, or cases where the robot is uncertain. The user may also input custom identifiers, for example, a user may input the identifier 'Bob's mug', rather than the more general classifier of 'mug'.

Requesting the user to identify surfaces may also help to avoid erroneous classification by the robot, particularly, in borderline cases, cases where a new surface has been identified, or cases where the robot is uncertain.

In embodiments, the desired action comprises a cleaning action. In embodiments, the cleaning action comprises one or more of vacuum cleaning, wiping, mopping, tidying, and dusting. The robot can therefore perform a variety of different cleaning actions, depending upon the user input.

It will of course be appreciated that features described in relation to one aspect of the present invention may be incorporated into other aspects of the present invention. For example, a method of the invention may incorporate any of the features described with reference to an apparatus of the invention and vice versa.

BRIEF DESCRIPTION OF THE DRAWINGS

Embodiments of the present disclosure will now be described by way of example only with reference to the accompanying drawings, of which.

DETAILED DESCRIPTION

Figure 1:
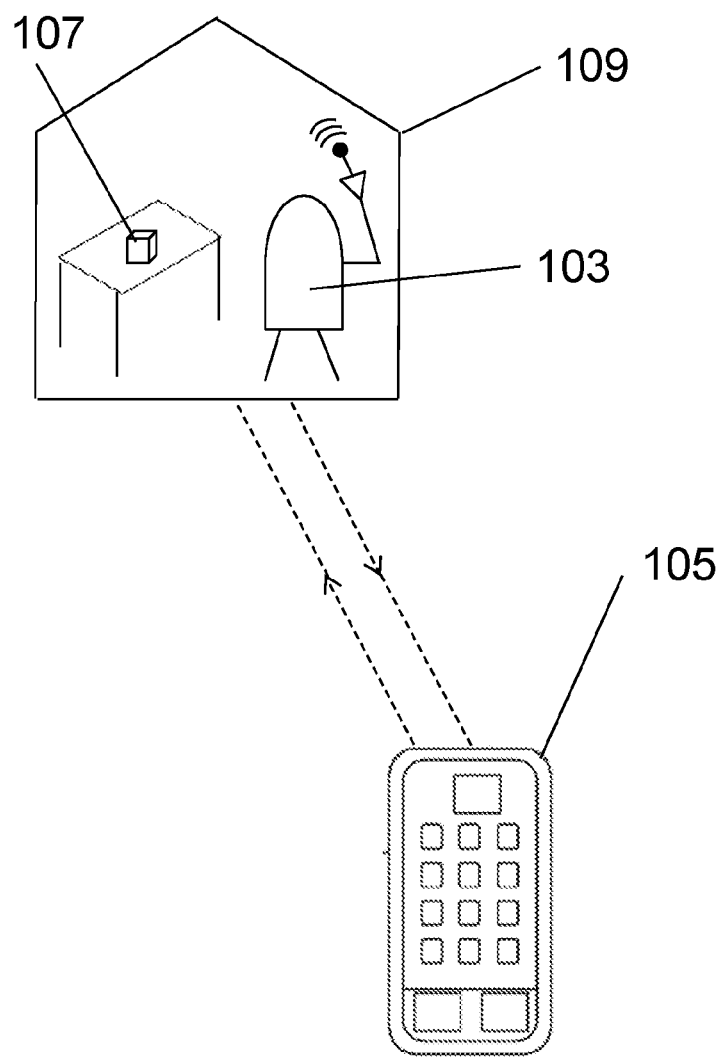
FIG. 1 is a system diagram of a robot and an electronic user device according to embodiments.

FIG. 1 shows a system diagram of a robot 103 and an electronic user device 105, according to embodiments. In embodiments, electronic user device 105 receives, from robot 103, data representative of an environment 109 of robot 103. The received data indicates the location of at least one moveable object 107 in the environment 109. In response to receipt of the representative data, a representation of the environment 109 of robot 103 is displayed on a graphical display of electronic user device 105. Electronic user device 105 receives input from a user indicating a desired location for the at least one moveable object 107 in environment 109 of robot 103. In response to receipt of the user input, control data is transmitted to robot 103, the control data being operable to cause robot 103 to move the at least one object 107 to the desired location in environment 109 of robot 103. Data is transferred between robot 103 and electronic user device 105 and vice versa. In embodiments, robot 103 and electronic user device 105 interact via a network; in such embodiments, robot 103 and electronic user device 105 are typically not located in the vicinity of each other. The network may comprise one or more wired networks and/or one or more wireless networks. In embodiments, robot 103 and electronic user device 105 interact via a direct air interface (e.g. communication via a wireless communication protocol such as Bluetooth™ or WiFi Direct™); in such embodiments, robot 103 and electronic user device 105 are typically located in the vicinity of each other. In embodiments, environment 109 of robot 103 comprises a building such as a house, one or more floors of a building, and/or one or more rooms of a building. In embodiments, object 107 comprises a household item, an item of clothing, or an item of furniture, etc.

Figure 2:
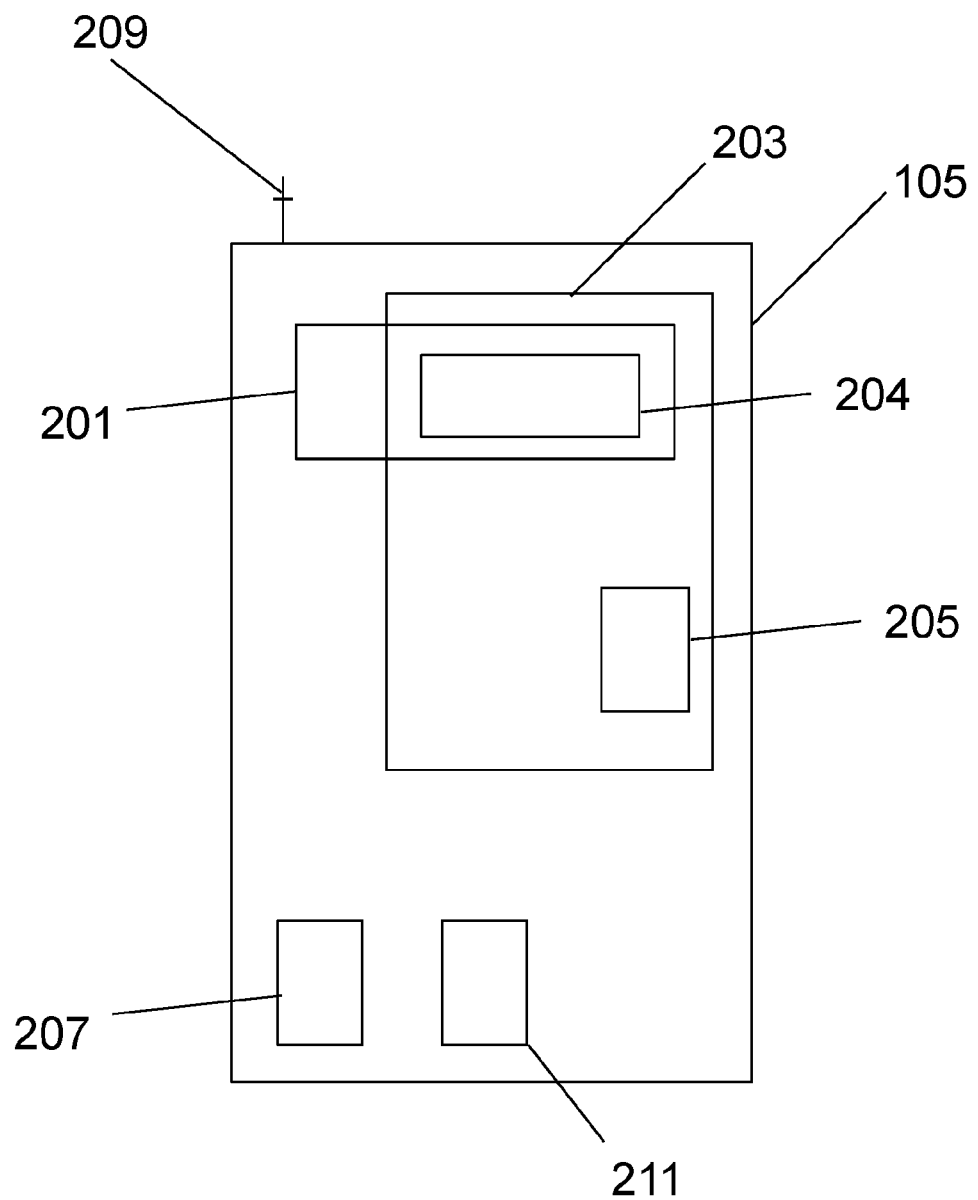
FIG. 2 is a block diagram of an electronic user device according to embodiments.

FIG. 2 shows a block diagram of electronic user device 105 according to embodiments. Electronic user device 105 comprises a graphical display 201. Electronic user device 105 comprises a user interface 203, which may include a touch-screen display 204 and/or a microphone 205 for allowing user input. In embodiments, graphical display 201 comprises touch-screen display 204, and user input is received via touch-screen display 204 of electronic device 105. Electronic user device 105 comprises a transceiver 209 for transmitting data to robot 103 (for example control data) and receiving data from robot 103 (for example data representative of environment 109). Electronic user device 105 comprises a processor system 207 for performing various data processing functions according to embodiments. Electronic user device 105 comprises one or more memories 211 for storing various data according to embodiments.

In embodiments, electronic user device 105 receives, from robot 103 data representative of environment 109 of robot 103, indicating a location of at least one moveable object 107 in environment 109. Electronic user device 105 displays the representation of environment 109 of robot 3 on graphical display 201. In embodiments, the user input comprises a drag and drop action, from a current location of the at least one moveable object 107 to the desired location. In embodiments, the drag and drop action is performed by the user via touch-screen display 204.

The user interface may include a microphone 205, and user input may be received via microphone 205. In some such embodiments, the user input comprises an audible indication of the desired location for the at least one moveable object 107.

In embodiments, electronic user device 105 comprises a mobile computer, a personal computer system, a wireless device, phone device, desktop computer, laptop, notebook, netbook computer, handheld computer, a remote control, a consumer electronics device, or in general any type of computing or electronic device.

Figure 3:
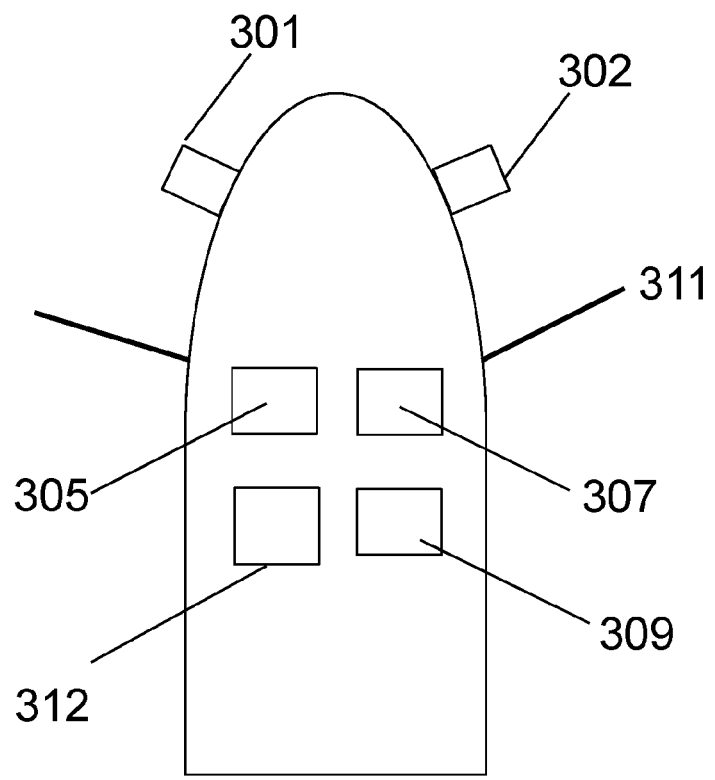
FIG. 3 is a schematic of a robot according to embodiments.

FIG. 3 shows a robot 103 according to embodiments. Robot 103 comprises one or more sensors 301. Sensors 301 sense a set of parameters that are representative of the environment of robot 103. Robot 103 comprises a transceiver 309 for receiving data from electronic user device 105 and transmitting data to electronic user device 105. Robot 103 comprises a processor system 307 for processing data from electronic user device 105, and a data storage module 312 for storing data. In embodiments, robot 103 comprises an imaging sensor 302 (e.g. a camera), and robot 103 may communicate image data to electronic user device 105. In embodiments, robot 103 transmits image data representative of the environment 9 of robot 103 using the transceiver 309, to electronic device 105. The transmitted data may relate to a three-dimensional location or position of objects 107 within the environment 109. The transmitted data may include data indicating the height at which objects are placed within the environment 109.

In embodiments, robot 103 comprises one or more mechanical arms 311 for moving objects. The mechanical arms 311 may comprise grabbers for grabbing (picking up or otherwise taking hold of) objects. Control data may be received at transceiver 309 of robot 103 from electronic user device 105. The control data may cause a mechanical arm 311 to move an object 107 from its current location to a desired location.

Figure 4:
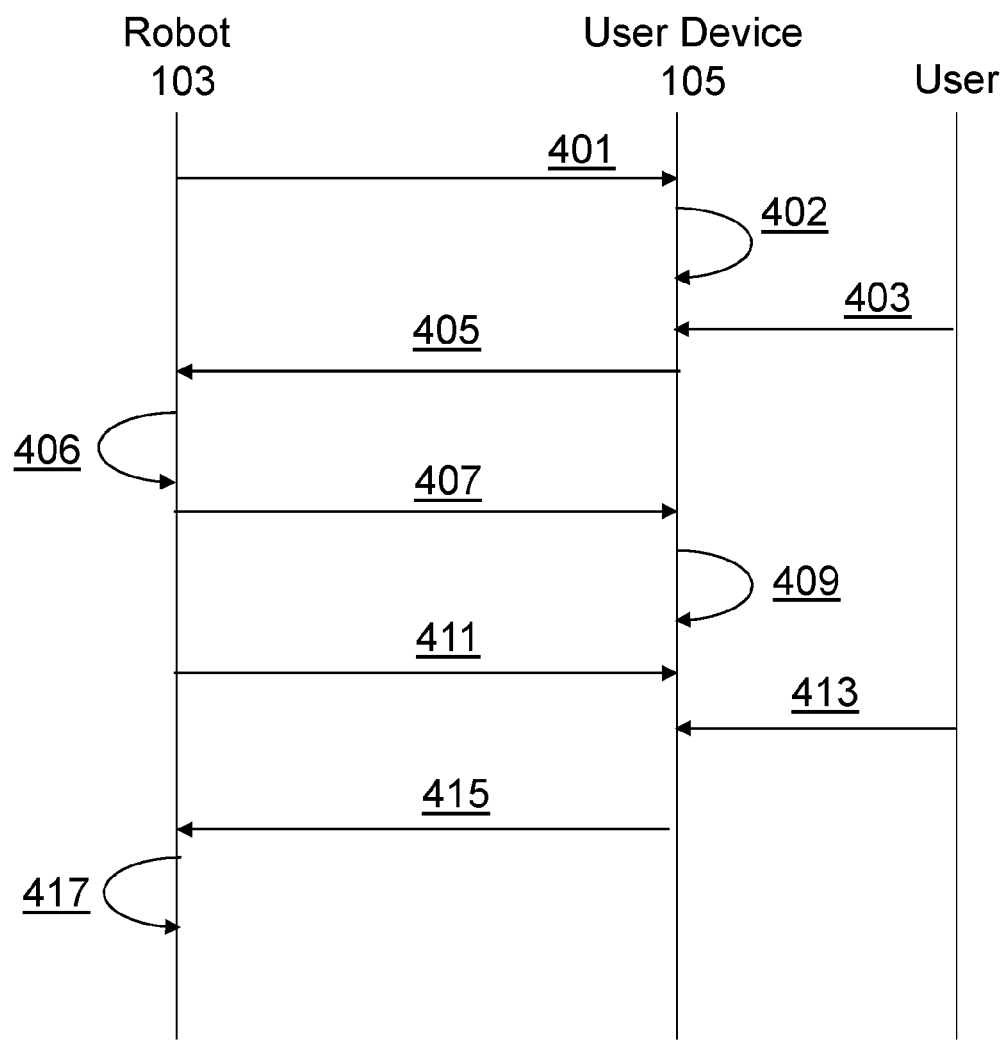
FIG. 4 is a message flow diagram showing data communication between a robot and an electronic user device according to embodiments.

Embodiments comprise methods, apparatus and computer programs for use in controlling a robot 103 using an electronic user device 105. In embodiments, data communication is conducted between robot 103 and electronic user device 105, as shown in FIG. 4.

In step 401, data representative of an environment 109 of robot 103 is received at electronic user device 105 via transceiver 209. The received data indicates the location of at least one object in environment 109.

In step 402, the received data is processed by a processing system 207 of electronic user device 105. In response to receipt of the representative data, the environment of robot 103 is displayed on graphical display 201 of electronic user device 105.

In step 403, electronic user device 105 receives user input from a user of electronic user device 105 indicating a desired location for the at least one moveable object 107 in environment 109 of robot 103.

In embodiments, a user interface of electronic user device 105 comprises a touch screen display, and the user input is provided by the user dragging the at least one moveable object 107 from a current location to a desired location within the display 109 and dropping the object at the desired location.

In embodiments, a user interface of electronic user device 105 comprises a microphone 205, and the user input is provided by the user audibly indicating the desired location of an object within the environment 109.

In step 405, in response to receiving input from a user of electronic device 105 indicating a desired location for the at least one moveable object 107 in the environment 109 of robot 103, the data is processed by processor system 207, and control data is transmitted to robot 103 using transceiver 209. The control data is operable to cause robot 103 to move the at least one moveable object 107 to the desired location in the environment 109 of robot 103.

In step 406, the control data is received at transceiver 309 of robot 103, and is processed by a processor system 307 of robot 103. In embodiments, the control data controls the path of robot 103 to the desired location in the environment 109. In embodiments, the control data comprises a desired end location in the environment 9, and robot 103 determines a path to this location.

In step 407, at transceiver 207 of electronic user device 105, confirmation data is received from robot 103, confirming that the at least one moveable object 107 has been moved to the desired location within environment 109.

In step 409, the confirmation data is processed at processor system 207 of electronic user device 105, and in response to receipt of the confirmation data, electronic user device 105 displays an updated environment 109 of robot 103 on graphical display 201; the updated environment 109 indicates the location of the at least one moveable object 107.

In step 411, transceiver 209 of electronic user device 105 receives from transceiver 309 of robot 103, request data, requesting the user to provide an identifier for one or more objects 107 in the environment 109.

In embodiments, object 107 is an object that has been sensed by robot 103 using a sensor 303, but that robot 103 has not yet moved. In embodiments, object 107 is an object 107 that has been previously moved by robot 103. In embodiments, request data is transmitted to electronic user device during idle time, during which robot 103 is not moving objects 107 to desired locations, but is sensing objects 107 within environment 109.

In step 413, electronic user device 105 receives input from a user indicating a desired identifier for the at least one object 107 in environment 109 of robot 103. In embodiments, the identifier comprises a label, which may be specific to the object, or may classify the object into a particular group or class. For example, the identifier may label the object with a group label such as 'clothing' or 'furniture' or may label the object with a specific label such as 'favourite mug'. The label and/or the location for an object may be determined using image processing and/or machine learning. For example, the shape of a "bowl" may be taught and the association of between a "bowl" and a "cupboard" may also be taught.

In embodiments, the user inputs the desired identifier for the at least one object 107 by typing the identifier into electronic user device 105, for example, using a keypad or keyboard, or using touch screen display 204. In embodiments, the user inputs the desired identifier using an audible command received at a microphone 205 of electronic user device 105. In embodiments, the user may select an identifier from a list of identifiers stored in the memory 211 of electronic user device 105.

In step 415, response data, including a provided, desired identifier is transmitted from electronic user device 105 to robot 103. In embodiments, in step 417 the response data is processed by a processor system 307 of robot 103, and may be stored in the storage module 312 of robot 103, such that during future use robot 103 will be able to identify this object 107 using the identifier.

Figure 5:
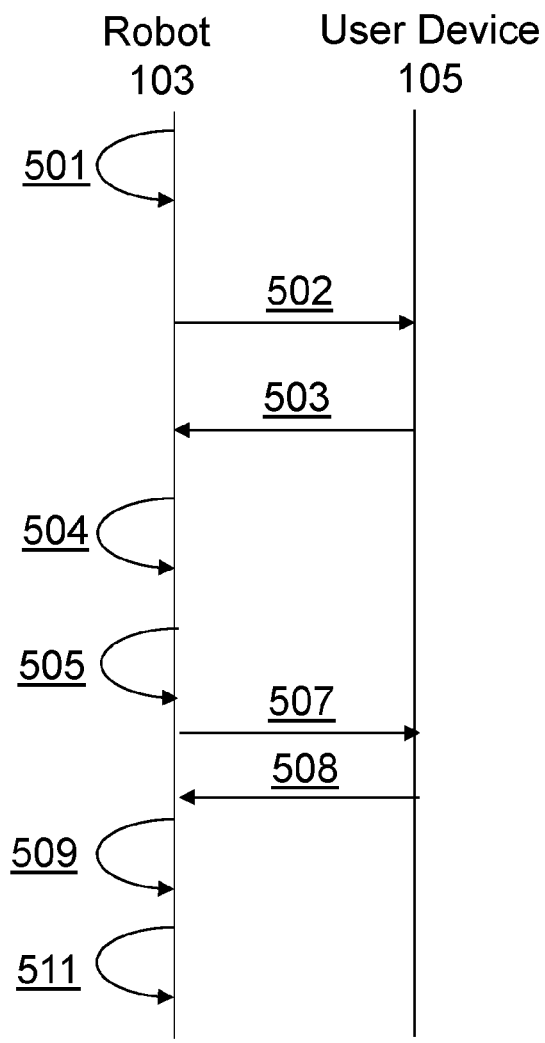
FIG. 5 is a message flow diagram showing data communication between a robot and an electronic user device according to embodiments.

Embodiments comprise methods, apparatus and computer programs for use in operating a robot 103, robot 103 having one or more sensors 303. Data communication is conducted between robot 103 and electronic user device 105, as shown in FIG. 5.

In step 501, at robot 103, a representation of the environment 109 of robot 103 is generated, by operating the at least one sensor 301 of robot 103 to sense a set of parameters representative of the environment 109 of robot 103. The representation comprises a location for at least one moveable object 107 in the environment 109.

In step 502, data representative of the environment of robot 103 is transmitted from a transceiver of robot 103 to a transceiver of electronic user device 105. The environment 109 of robot 103 may be displayed on graphical display 201 of electronic user device 105.

In step 503, transceiver 309 of robot 103 receives control data from transceiver 209 of electronic user device 105. The control data indicates a desired location for the at least one moveable object 107 in the environment 109 of robot 103.

In step 504, in response to receipt of the control data from electronic device 105, robot 103 is operated to move the at least one object 107 to the desired location in the environment 109 of robot 103.

In step 505, generating a representation of the environment of robot 103 comprises, at robot 103, generating a list of known objects and associated identifiers.

In embodiments the list is generated by a processor system 307 of robot 103, in response to receiving data indicating desired identifiers for objects 107 from electronic user device 105. In embodiments, the list of known objects 107 and identifiers for each object 107 in the list is stored in the storage module 312 of robot 103.

In embodiments, at robot 103, unknown objects 107 not in the list are identified. In step 507, in response to the identification of an unknown object, a request is transmitted from the transceiver 309 of robot 103 to the transceiver 209 of electronic user device, to identify the unknown object 107. In embodiments, the unknown object 107 is displayed on graphical user display 201.

In step 508, the transceiver 309 of robot 103 receives data from electronic user device 105 indicating an identifier for the unknown object 107. In embodiments, the identifier is input by a user into electronic user device 105.

In embodiments, in step 509, in response to receipt of the data indicating the identifier, at robot 103, the list is updated to associate the identifier with the unknown object 107. In embodiments, the updated list is stored in the storage module 312 of robot 103.

In embodiments, the generated representation of the environment of robot 103 is maintained. In step 511, the representation is periodically updated. In embodiments, the representation is updated in response to operation of one or more of the sensors 301, indicating a change in one or more of the parameters in the set.

In embodiments, updated representations are displayed on graphical display 201 of electronic user device 105.

In embodiments, the list comprises a home location for at least one object 107 in the list. In embodiments, the list comprises a label indicating what the object 107 is (for example, a mug), or grouping the object 107 by type of object 107 (for example, clothing), and a home location (for example, the object 107 is a mug and the home location is the cupboard).

In embodiments, the list comprises a plurality of objects 107 that have the same identifier, where the objects 107 in the plurality have the same home location. For example, a plurality of objects 107 may have the identifier mug, and each of these objects may have the home location of cupboard.

In embodiments, the list comprises an object or a plurality of objects having the same identifier, where the object has a plurality of home locations. For example, an object or a plurality of objects may have the identifier mug, and the mug may have a plurality of home locations, e.g "cupboard 1" and "cupboard 2".

In embodiments, step 507, where a request is transmitted to identify the unknown object 107, further comprises a request to specify a home location of the unknown object. In embodiments, step 508, where data is received at robot 103, the received data comprises data specifying the home location for the unknown object 107. In embodiments, step 509, which comprises updating the list, includes updating the list to include the specified home location for the unknown object 107.

In embodiments, step 504, which comprises operating robot 103 to move the at least one object 107 to the desired location in the environment 109 of robot 103 comprises operating robot 103 to move the at least one object 107 to its home location.

Figure 6:
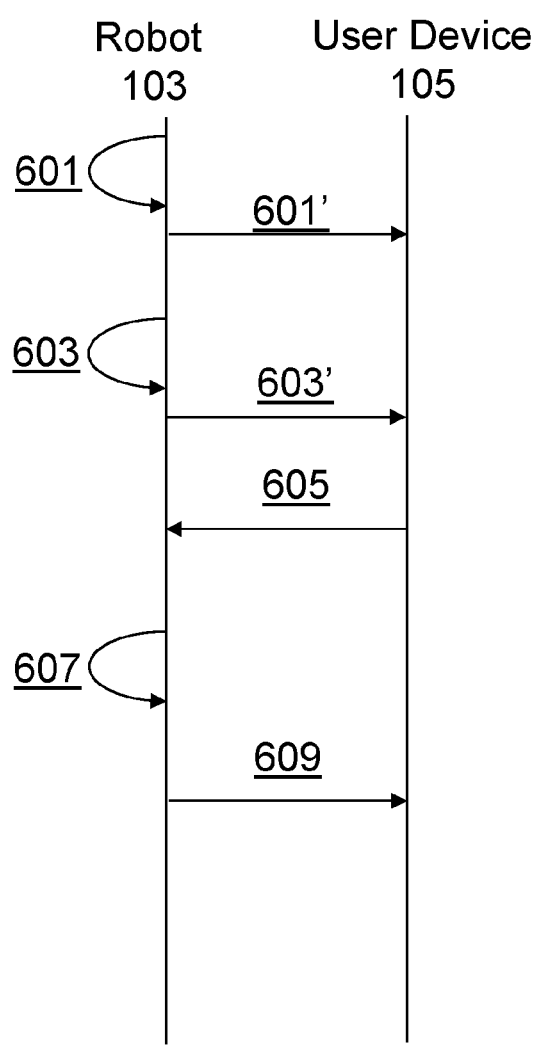
FIG. 6 is a message flow diagram showing data communication between a robot and an electronic user device according to embodiments.

Embodiments comprise methods of operating a robot, apparatus and computer programs for use in operating robot 103 using electronic user device 105, wherein robot has one or more sensors 301. Data is transferred between robot 103 and electronic user device 105 and vice versa as shown in the system diagram of FIG. 1. In embodiments, electronic user device is an electronic user device as described in relation to FIG. 2. In embodiments, robot 103 is a robot 103 as described in relation to FIG. 3. Data communication is conducted between robot 103 and the user device 105, as shown in FIG. 6.

In embodiments, at robot 103, in step 601 a representation of the environment 109 of robot 103 is generated. The representation is generated by operating one or more sensors 301 to sense a set of parameters representative of the environment 109 of robot 103. In embodiments, an image sensor 302 is used to generate the representation. In embodiments, the set of parameters describe the location of robot 103, for example, a room that robot 103 is in, or the floor of a house that robot 103 is located on.

In step 603, at robot 103, a list of objects 107 in the environment 109 and associated identifiers for each object in the list are generated. In embodiments, the objects 107 and associated identifiers may be objects 107 and identifiers that are known to robot 103, as a result of previous identification by a user. In embodiments, the objects and associated identifiers may be objects and associated identifiers that are stored in the storage module 312 of robot 103.

In step 605, control data from electronic user device 105 is received at a transceiver 309 of robot 103. The control data comprises an identifier for an object 107 in the generated list that a user of electronic device 105 wishes to locate in the environment. For example, the control data may identify a set of keys (for example house keys or car keys) as an object that the user wishes to locate in the environment.

In step 607, in response to receipt of the control data, robot 103 and one or more of the sensors 301 are operated to search the environment 109 to determine a location of the identified object 107 in the environment 109.

In embodiments, at step 609, robot 103 may transmit an indication of the determined location of the identified object 107 in the environment 109 to electronic user device 105.

In embodiments, as part of the step 603, at step 603', robot 103, or an external device transmits the generated list of objects to electronic user device 105.

In embodiments, as part of step 601, at step 601', robot 103, or an external device transmits the set of parameters representative of the environment 109 of robot 103 to electronic user device 105.

In embodiments, as part of step 603, the last known location for at least one object in the list is generated. For example, the list may comprise an object 107 and identifier as 'keys' and may list the last known location as 'kitchen table'.

In embodiments, step 607 comprises operating robot 103 to move proximate to the last known location of the identified object 107. For example, step 607 may comprise operating robot to move proximate to the 'kitchen table', which is the last known location of the 'keys'.

In embodiments, step 607 comprises operating robot 103 to move the identified object 107 to a given location. The location may be a different location from the last known location within the environment. For example, in embodiments, step 607 comprises operating robot 103 to move the 'keys' to 'the key hook'. In embodiments, the location may be the location of the user within the environment, such that step 607 comprises operating robot 103 to bring the 'keys' to the user.

In embodiments, in step 605, the control data may comprise the new, given location for the object 107. The control data may therefore specify that the 'keys' should have a new location of 'the key hook'. In response to this control data, in embodiments, robot 103 is operated to move the 'keys' to 'the key hook'.

Embodiments comprise methods of operating a robot, apparatus and computer programs for use in operating a robot 103 using an electronic user device 105, wherein robot 103 has one or more sensors 301.

Figure 7:
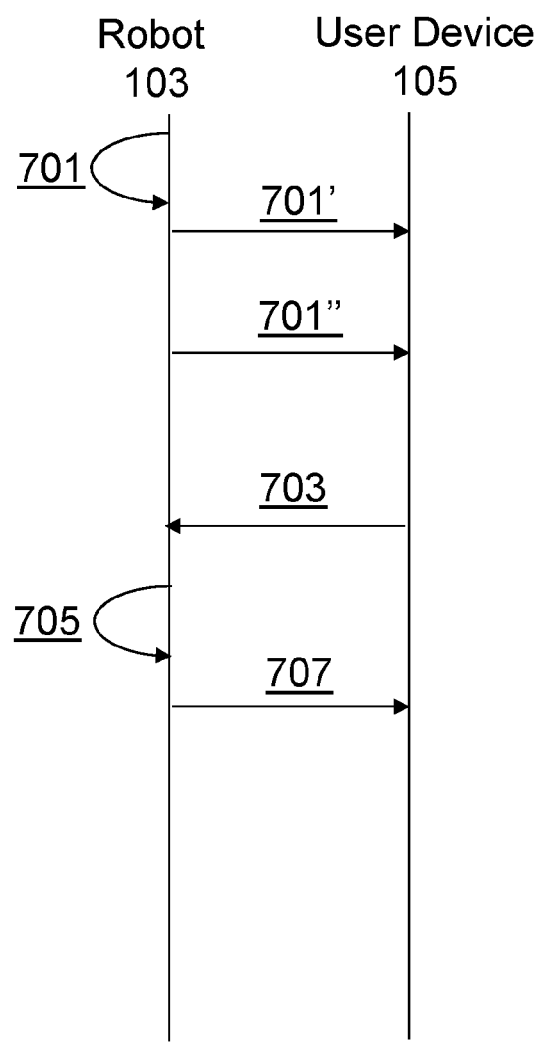
FIG. 7 is a message flow diagram showing data communication between a robot and an electronic user device according to embodiments.

Data is transferred between robot 103 and electronic user device 105 and vice versa as shown in the system diagram of FIG. 1. In embodiments, electronic user device 105 is an electronic user device as described in relation to FIG. 2. In embodiments, robot 103 is a robot 103 as described in relation to FIG. 3. Data communication is conducted between robot 103 and electronic user device 105, as shown in FIG. 7.

In step 701, at robot 103, a representation of the environment 109 is generated by operating the one or more sensors 301 to sense a set of parameters representative of the environment 109 of robot 103. The representation comprises at least one surface in the environment other than a surface on which robot 103 is located. In embodiments, the representation is generated by operating an image sensor 302. In embodiments, the representation comprises one or more surfaces such as kitchen cabinet surfaces, table-tops, surfaces of upholstery, etc.

In step 703, at robot 103, control data is received from a transceiver 209 of electronic user device, 105, the control data indicating a desired action to be performed at the at least one surface in the environment 109 of robot 103.

In step 705, in response to receipt of the control data, robot 103 is caused to perform the desired action at the at least one surface in the environment 109 of robot 103.

In embodiments, step 701 comprises, at step 701' transmitting data representative of the environment 109 of robot 103 to electronic user device 105. In embodiments, the data comprises information that informs the user which room of the environment 109 robot 103 is currently in, or which floor of the house within the environment 109 that robot 103 is currently located on. In embodiments, the data comprises information regarding surfaces that are accessible to robot 103.

In embodiments, robot 103 comprises a surface cleaning component. In embodiments, a mechanical arm 311 of robot 103 comprises a surface cleaning component. In embodiments, the surface cleaning component is an attachment which can be mounted on a mechanical arm 311 of robot 103. For example, the attachment may be a polishing attachment, a vacuum cleaning attachment, a mopping attachment, a wiping attachment, a dusting attachment, etc.

In embodiments, the desired action comprises a cleaning action. In embodiments, the cleaning action comprises one or more of vacuum cleaning, wiping, mopping, tidying and dusting.

In embodiments, the first step 701 of generating a representation of the environment 109 of robot 103 comprises generating a list of known surfaces in the environment 109 and an associated identifier for each surface in the list. The list may comprise, for example, known surfaces and associated identifiers that are currently in the same room of the environment 109 as robot 103. In embodiments, the known surfaces and associated identifiers will have been previously identified to robot 103 by the user of electronic user device 105. In embodiments, the know surfaces and associated identifiers will be stored in the storage module 312 of robot 103. In embodiments, step 701 comprises, at step 701", transmitting the generated list to electronic user device 105.

In embodiments, at step 703, the control data received at robot 103 comprises an associated identifier for at least one surface on the stored list at which the desired action is to be performed. For example, the stored list may include surfaces in a kitchen and their associated identifiers, and the control data received at robot 103 may comprise the identifier 'kitchen table' and may indicate that the 'kitchen table' is to be wiped.

In step 707, upon completion of performing the desired action at the at least one surface in the environment 109 of robot 103, a desired action completed notification is transmitted to electronic user device 105. In embodiments, the notification is displayed to a user of electronic user device 105 on a graphical display 201. In embodiments, the notification comprises an updated representation of the environment 109 of robot 103.

In embodiments, the generated representation of the environment 109 of robot 103 is maintained. In embodiments, maintaining the generated representation comprises periodically updating the generated representation, and updating the generated representation in response to the operation of one or more sensors 301 indicating a change in or more of the set of parameters. In embodiments, the generated, updated representation is transmitted to electronic user device 105, and is displayed on graphical display 201.

Figure 8:
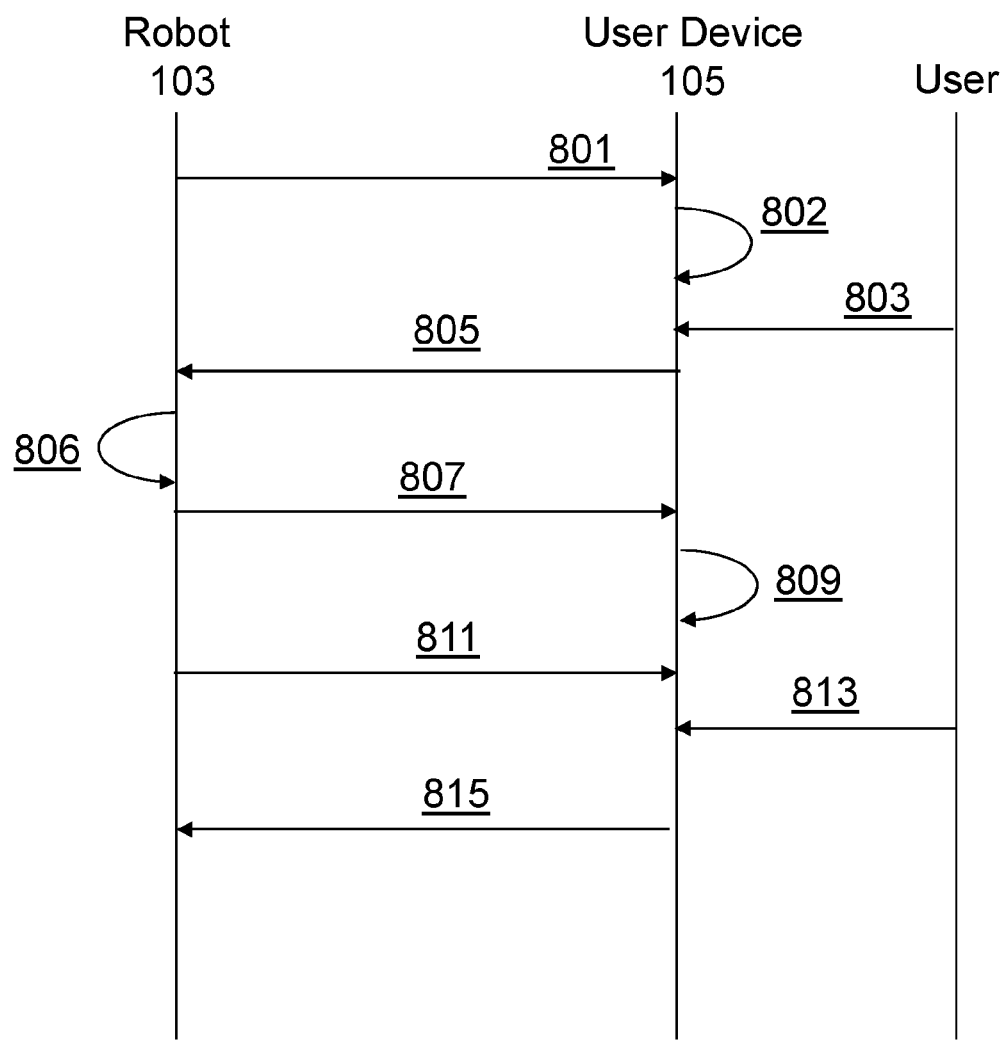
FIG. 8 is a message flow diagram showing data communication between a robot and an electronic user device 105 according to embodiments.

Embodiments of the present disclosure comprise methods, apparatus and computer programs for use in controlling a robot at an electronic user device. Data communication is conducted between robot 103 and electronic user device 105, as shown in FIG. 8.

In step 801, a transceiver 209 of an electronic user device 105 receives, from a transceiver 309 of a robot 103, data representative of an environment 109 of robot 103. The received data indicates at least one surface in the environment 109 of robot 103, other than a surface on which robot 103 is located.

In step 802, in response to receipt of the representative data, a representation of the environment 109 of robot 103 is displayed on a graphical display 201 of electronic user device 105.

In step 803, input is received from a user of electronic user device 105 indicating a desired action to be performed at the at least one surface in the environment of robot 103.

In step 805, in response to receipt of the user input, control data is transmitted from a transceiver 209 of electronic user device 105 to a transceiver 309 of robot 103.

In embodiments, the control data is received at a transceiver 309 of robot 103, and is processed by a processor 307 of robot 103, in step 806. In embodiments, the control data controls the path of robot 103 to the desired location in the environment 109. In embodiments, the control data comprises a desired end location in the environment 9, and robot 103 determines a path to this location.

In embodiments, the control data is operable to cause robot 103 to perform the desired action at the at least one surface in the environment 109 of robot 103.

In step 803, user input is received via the display of electronic user device 105. In embodiments, user interface 203 of electronic user device 105 comprises touch screen display 204, and the user input is provided by the user using the touch screen display to direct robot 103 to a surface within the environment 109. In embodiments, a keypad or keyboard is used to allow a user to input a desired action for robot 103.

In embodiments, user interface 203 of electronic user device 105 comprises microphone 205, and user input is received via microphone 205. In such embodiments, the user input comprises audible indication of the desired action to be performed at the at least one surface in the environment of robot 103.

In step 807, a transceiver 209 of electronic user device 105 receives confirmation data from a transceiver 309 of robot 103, confirming that the desired action has been performed at the at least on surface in the environment 109 of robot 103.

In step 809, in response to receipt of the confirmation data, an updated environment 109 of robot 103 is displayed on a graphical display 201 of electronic user device 105. The updated environment 109 indicates that the desired action has been performed at the at least one surface in the environment 109 of robot 103.

In step 811, a transceiver 209 of electronic user device 105 receives a request from robot 103, requesting the user to provide an identifier for a given surface in the environment 109 of robot 103. In embodiments, a sensor 301 of robot 103 may sense an unknown surface, and in response to this, may transmit a request to electronic user device 105, requesting that the user provides an identifier for the surface.

In step 813, electronic user device 105 may receive input from a user of electronic user device 105 indicating a desired identifier for the given surface in the environment of robot 103. In embodiments, the identifier is a label, which may be specific to the surface, or may classify the object into a particular group or class. For example, the identifier may label the surface with a group label such as 'carpet' or 'tiles' or may label the object with a specific label such as 'kitchen countertop'.

In step 815, a transceiver 209 of electronic user device 105 transmits response data to robot 103, the response data including the desired identifier.

In embodiments, the desired action comprises a cleaning action. In embodiments, the cleaning action comprises one or more of vacuum cleaning, wiping, mopping, tidying and dusting.

In embodiments of the present disclosure, robot 103 and electronic user device 105 comprise a processing system (307, 207 respectively). Each processing system may comprise one or more processors and/or memory. Each device, component, or function as described in relation to any of the examples described herein, for example the graphical display 201 or microphone 205 of electronic user device 105, may similarly comprise a processor or may be comprised in apparatus comprising a processor. One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The one or more processors of processing systems 307, 207 may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software.

In embodiments, robot 103, electronic user device 105 and the processor systems 307, 207 comprise data storage (or 'memory', or a 'data storage module 312'). Data storage may comprise one or both of volatile and non-volatile memory. Data storage may comprise one or more of random access memory (RAM), read-only memory (ROM), a magnetic or optical disk and disk drive, or a solid-state drive (SSD). It will be appreciated by the skilled person that many other types of memory, in addition to the examples provided, may be used to store the captured video. It will be appreciated by a person skilled in the art that processing systems may comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

The invention claimed is:

1. A method of operating a robot, the robot having one or more sensors, the method comprising:
generating, at the robot, a representation of an environment of the robot by operating the one or more sensors to sense a set of parameters representative of the environment of the robot, wherein the representation comprises at least one surface in the environment other than a surface on which the robot is located, wherein the generating comprises generating a list of surfaces in the environment and an associated identifier for each surface in the list;

transmitting the generated list to the electronic user device;

identifying unknown objects that are not on the list, and sending the unknown objects to electronic user device to request an identification for the unknown objects;

receiving control data, at the robot, from the electronic user device, wherein the received control data comprises the associated identifier for at least one surface on the stored list at which the desired action is to be performed, the control data indicating a desired action to be performed at the at least one surface in the environment of the robot; and in response to receipt of the control data, causing the robot to perform the desired action at the at least one surface in the environment of the robot.

2. The method according to claim 1, comprising transmitting data representative of the environment of the robot to the electronic user device.

3. The method according to claim 1, wherein the robot comprises a surface cleaning component,
and wherein the desired action comprises a cleaning action.

4. The method according to claim 3, wherein the cleaning action comprises one or more of:
vacuum cleaning,
wiping,
mopping,
tidying, and
dusting.

5. The method according to claim 1, comprising, upon completion of performing the desired action at the at least one surface in the environment of the robot, transmitting a desired action completed notification to the electronic user device.

6. The method according to claim 1, comprising maintaining the generated representation, at the robot or an external device, by one or more of:
periodically updating the generated representation, and
updating the generated representation in response to operation of the one or more sensors indicating a change in one or more of the set of parameters.

7. Apparatus for use in operating a robot, the robot having one or more sensors, the apparatus being configured to:
generate, at the robot, a representation of an environment of the robot, by operating the one or more sensors to sense a set of parameters representative of the environment of the robot, wherein the representation comprises at least one surface in the environment other than the surface on which the robot is located, wherein the generating comprises generating a list of surfaces in the environment and an associated identifier for each surface in the list;
identify unknown objects that are not on the list, and send the unknown objects to electronic user device to request an identification for the unknown objects;
receive control data, at the robot from the electronic user device, wherein the received control data comprises the associated identifier for at least one surface on the stored list at which the desired action is to be performed, the control data indicating a desired action to be performed at the at least one surface in the environment of the robot; and in response to receipt of the control data, cause the robot to perform the desired action at the at least one surface in the environment of the robot.

8. A computer program product comprising a set of instructions, which, when executed by a computerised device, cause the computerized device to perform a method of operating a robot, the robot having one or more sensors, the method comprising:
generating, at the robot, a representation of an environment of the robot, by operating the one or more sensors to sense a set of parameters representative of the environment of the robot, wherein the representation comprises at least one surface in the environment other than a surface on which the robot is located, wherein the generating comprises generating a list of surfaces in the environment and an associated identifier for each surface in the list;
identifying unknown objects that are not on the list, and send the unknown objects to electronic user device to request an identification for the unknown objects;
receiving control data, at the robot from the electronic user device, wherein the received control data comprises the associated identifier for at least one surface on the stored list at which the desired action is to be performed, the control data indicating a desired action to be performed at the at least one surface in the environment of the robot; and
in response to receipt of the control data, causing the robot to perform the desired action at the at least one surface in the environment of the robot.

9. A robot having one or more sensors, the robot being configured to:
generate a representation of an environment of the robot, by operating the one or more sensors to sense a set of parameters representative of the environment of the robot, wherein the representation comprises at least one surface in the environment other than a surface on which the robot is located, wherein the generating comprises generating a list of surfaces in the environment and an associated identifier for each surface in the list;
identify unknown objects that are not on the list, and send the unknown objects to electronic user device to request an identification for the unknown objects;
receive control data from the electronic user device, wherein the received control data comprises the associated identifier for at least one surface on the stored list at which the desired action is to be performed, the control data indicating a desired action to be performed at the at least one surface in the environment of the robot; and
in response to receipt of the control data, perform the desired action at the at least one surface in the environment of the robot.

10. A method of controlling a robot, the method comprising, at an electronic user device:
receiving, from the robot, data representative of an environment of the robot, the received data indicating at least one surface in the environment other than a surface on which the robot is located;
receiving from the robot a list of surfaces in the environment and an associated identifier for each surface in the list;
receiving from the robot a set of unknown objects that are not on the list with a request to identify the unknown objects;

in response to receipt of the representative data, displaying a representation of the environment of the robot on a graphical display of the electronic user device;

receiving input from a user of the electronic user device indicating a desired action to be performed at the at least one surface in the environment of the robot; and in response to receipt of the user input, transmitting control data to the robot, the control data being operable to cause the robot to perform the desired action at the at least one surface in the environment of the robot, wherein the transmitted control data comprises the associated identifier for the at least one surface on the stored list at which the desired action is to be performed.

11. The method according to claim 10, wherein the user input is received via the display of the electronic user device.

12. The method according to claim 11, wherein the user input is received via a microphone, and
wherein the input comprises an audible indication of the desired action to be performed at the at least one surface in the environment of the robot.

13. The method according to claim 10, comprising:
receiving, from the robot, confirmation data confirming that the desired action has been performed at the at least one surface in the environment of the robot; and in response to receipt of the confirmation data, displaying an updated environment of the robot on the graphical display, wherein the updated environment indicates that the desired action has been performed at the at least one surface in the environment of the robot.

14. The method according to claim 10, comprising:
receiving, from the robot, request data requesting the user to provide an identifier for a given surface in the environment of the robot;

receiving input from a user of the electronic user device indicating a desired identifier for the given surface in the environment of the robot; and transmitting, response data to the robot, the response data including the desired identifier.

15. The method according to claim 10, wherein the desired action comprises a cleaning action.

16. The method according to claim 15, wherein the cleaning action comprises one or more of:
vacuum cleaning,
wiping,
mopping,
tidying, and
dusting.

* * * * *